(12) United States Patent
Goffman

(10) Patent No.: US 10,161,429 B2
(45) Date of Patent: Dec. 25, 2018

(54) QUICK ATTACH ACCESSORY MOUNT

(71) Applicant: Dango Design, LLC, Cocolalla, ID (US)

(72) Inventor: Daniel Goffman, Cocolalla, ID (US)

(73) Assignee: Dango Design, LLC, Cocolalla, ID (US)

( * ) Notice: Subject to any disclaimer, the term of this patent is extended or adjusted under 35 U.S.C. 154(b) by 0 days.

(21) Appl. No.: 15/422,233

(22) Filed: Feb. 1, 2017

(65) Prior Publication Data

US 2018/0087714 A1     Mar. 29, 2018

Related U.S. Application Data

(60) Provisional application No. 62/400,477, filed on Sep. 27, 2016.

(51) Int. Cl.
    *F16B 2/10*      (2006.01)
    *F16M 13/02*      (2006.01)
    (Continued)

(52) U.S. Cl.
    CPC .................. *F16B 2/10* (2013.01); *F16B 2/02* (2013.01); *F16B 2/04* (2013.01); *F16M 13/022* (2013.01);
    (Continued)

(58) Field of Classification Search
    CPC ..... F16B 2/02; F16B 2/04; F16B 2/10; F16M 13/022; B42F 1/02; B42F 1/1006
    (Continued)

(56) References Cited

U.S. PATENT DOCUMENTS 1,279,803 A * 9/1918 Watson ................. F16M 11/40
    138/120
4,840,341 A * 6/1989 Hasegawa ................ A47G 1/21
    211/89.01

(Continued)

FOREIGN PATENT DOCUMENTS

CA     2484135 A1 * 4/2006 ................ B42F 1/02
GB     1138232 A * 12/1968 ................ B42F 1/02

OTHER PUBLICATIONS

Dango Design Official Store—Motorcycle Accessories and GoPro Mounts, accessed on Nov. 22, 2017, via website https://dango-design.com/grippermount/.

*Primary Examiner* — Eret C McNichols
(74) *Attorney, Agent, or Firm* — Dorsey & Whitney LLP

(57) ABSTRACT

An accessory mount having a clamp has an upper arm pivotably connected to a lower arm. The upper arm has a framework of a plurality of legs and cross members joined together and configured to flex with respect to each other when placed under a load. A tab extends at an angle from one end of the framework. A hinge plate is positioned between the framework and the tab. The lower arm has an elongate web and a tab extending at an angle from one end of the elongate web. A hinge plate may be positioned between the elongate web and the tab and may be attached to the first hinge plate at a pivot connection. A bias member is attached to and positioned between the upper arm and the lower arm to bias the upper arm and the lower arm together about the pivot connection between the hinge plates. Each of the upper and lower arms is formed as unitary, monocoque construction.

17 Claims, 11 Drawing Sheets

(51) Int. Cl.
  *F16B 2/02*  (2006.01)
  *F16B 2/04*  (2006.01)
  *F16B 2/00*  (2006.01)
  *B42F 1/00*  (2006.01)
  *B42F 1/02*  (2006.01)

(52) U.S. Cl.
  CPC ............... *B42F 1/006* (2013.01); *B42F 1/02* (2013.01); *F16B 2/005* (2013.01)

(58) Field of Classification Search
  USPC .... 248/229.13, 229.23, 228.4, 230.4, 231.51
  See application file for complete search history.

(56) References Cited

U.S. PATENT DOCUMENTS

| | | | |
|---|---|---|---|
| 4,996,755 A * | 3/1991 | Sato | A61B 17/128 29/243.56 |
| 5,014,956 A * | 5/1991 | Kayali | B60N 3/102 248/311.2 |
| 5,033,528 A * | 7/1991 | Volcani | A45B 17/00 160/351 |
| 5,103,384 A * | 4/1992 | Drohan | F16M 11/40 362/190 |
| 5,148,581 A * | 9/1992 | Hartmann | A44B 99/00 16/4 |
| 5,400,234 A * | 3/1995 | Yu | F21V 21/088 362/396 |
| 5,402,558 A * | 4/1995 | Santapa | A47G 25/485 223/91 |
| 5,853,158 A * | 12/1998 | Riggle | A47G 23/0225 248/311.2 |
| D411,220 S * | 6/1999 | Surabian | 224/908 |
| 6,042,155 A * | 3/2000 | Lockwood | F16L 11/18 138/120 |
| 6,754,937 B1 * | 6/2004 | Martin | B42F 1/006 24/351 |
| D563,452 S | 3/2008 | Tan et al. | |
| D563,779 S * | 3/2008 | Yip | D8/395 |
| D564,559 S | 3/2008 | Stephens et al. | |
| D574,702 S | 8/2008 | Stephens et al. | |
| 7,533,906 B2 * | 5/2009 | Luettgen | H01R 35/00 285/146.1 |
| D670,285 S | 11/2012 | Hammitt | |
| D679,700 S | 4/2013 | Werth | |
| 8,602,662 B1 * | 12/2013 | Mans | F16M 11/041 248/160 |
| D703,659 S | 4/2014 | Werth | |
| D704,201 S | 5/2014 | Shubin | |
| 8,757,573 B1 * | 6/2014 | Barnes, Jr. | A47G 23/0225 220/737 |
| 8,800,941 B2 * | 8/2014 | Kahn | A46B 17/02 248/110 |
| 8,869,355 B2 * | 10/2014 | Huang | H02G 3/32 24/329 |
| D720,816 S * | 1/2015 | Nelson | D21/453 |
| 9,127,786 B1 * | 9/2015 | Arratia | A61M 25/09 |
| D772,969 S | 11/2016 | Druker et al. | |
| D795,676 S | 8/2017 | Karol et al. | |
| D800,823 S | 10/2017 | Druker et al. | |
| 9,803,797 B2 * | 10/2017 | Motosko | F16M 13/02 |
| D810,179 S | 2/2018 | Harms et al. | |
| 2003/0233740 A1 * | 12/2003 | Adams | B42F 1/006 24/501 |
| 2007/0193211 A1 * | 8/2007 | Harrison | A45C 13/08 52/750 |
| 2009/0179132 A1 | 7/2009 | Qin et al. | |
| 2010/0107373 A1 * | 5/2010 | Enga | B43K 23/001 24/351 |
| 2012/0174375 A1 * | 7/2012 | Mcleod | F16M 11/041 29/428 |
| 2015/0184800 A1 * | 7/2015 | Eskew | F16M 11/14 248/231.51 |
| 2015/0219130 A1 * | 8/2015 | Killion | F16M 13/022 24/507 |
| 2016/0112786 A1 * | 4/2016 | Murata | H04R 1/08 248/231.51 |
| 2016/0133237 A1 * | 5/2016 | Berlinger | G10D 13/029 84/411 P |
| 2016/0241289 A1 | 8/2016 | Wieth | |
| 2017/0202292 A1 | 7/2017 | Volmer | |

* cited by examiner

QUICK ATTACH ACCESSORY MOUNT

CROSS REFERENCE TO RELATED APPLICATIONS

This application claims the benefit of U.S. Provisional Patent Application No. 62/400,477 filed 27 Sep. 2016 entitled "Quick attach accessory mount," which is hereby incorporated herein by reference in its entirety.

FIELD

This disclosure relates generally to mounting systems, and more specifically to methods and apparatus for mounting systems for consumer accessories.

BACKGROUND

Current methods of attaching accessories to consumer objects can be a time consuming and difficult process. Different accessories may require different attachment modes to attach to similar objects, and different objects may require different attachment modes depending on the use or environment surrounding the object. To overcome these issues, a user may be required to carry multiple attachment devices for the different accessories, and also may carry multiple attachments devices based upon the base object that the accessory will be attached to and the type of use or environment the base object is being used within. The requirements of carrying multiple attachment devices may take up valuable storage space within luggage, gear, or equipment. In addition, current mounting solutions may be difficult to operate with gloved hands, such as when a user participates in outdoor sports and dexterity is limited.

The information included in this Background section of this specification, including any references cited herein and any description or discussion thereof, is included for technical reference purposes only and is not to be regarded subject matter by which the scope of the disclosure as defined in the claims is to be bound.

SUMMARY

In one exemplary implementation, a clamp may be formed of an upper arm pivotably connected to a lower arm. The upper arm may have a framework of a plurality of legs and cross members joined together and configured to flex with respect to each other when placed under a load. A first tab may extend at an angle from one end of the framework. A first hinge plate may be positioned between the framework and the tab. The framework, the tab, and the first hinge plate may be formed as unitary, monocoque construction. The lower arm may have an elongate web and a second tab extending at an angle from one end of the elongate web. A second hinge plate may be positioned between the elongate web and the tab and may be attached to the first hinge plate at a pivot connection. The elongate web, the tab, and the second hinge plate may be formed as unitary, monocoque construction. A bias member may be attached to each of the upper arm and the lower arm and positioned between the upper arm and the lower arm to bias the upper arm and the lower arm together about the pivot connection between the hinge plates.

In another example, a quick attach accessory mount may include an upper arm having a first end; a second end opposite the first end; an upper engagement member adjacent the first end; a plurality of knuckles extending from an interior surface of the upper engagement member; a plurality of flexible legs extending from the upper engagement member toward the second end; a plurality of cross members connected to and extending between the legs; a first cross brace connected to and extending between the legs and having a socket with grooves formed on an inside surface of the socket; and a second cross brace connected to and extending between the legs. In some examples, the mount may include a textured sleeve positioned at the second end of the upper arm and surrounding a portion of the legs and the second cross brace. In some examples, the mount may include a lower arm having a first end; a second end opposite the first end; a lower engagement member adjacent the first end; a plurality of knuckles extending from an interior surface of the lower engagement member; and a pin connecting the upper arm knuckles to the lower arm knuckles. In some examples, the clamp may include a clamp bias element surrounding the pin and adjacent the upper engagement member and lower engagement member, the clamp bias element in a first position forcing the upper engagement member away from the lower engagement member and forcing the second end of the upper arm toward the second end of the lower arm; and an accessory mount adjustably connected to the socket.

This Summary is provided to introduce a selectin of concepts in a simplified form that are further described below in the Detail Description. This summary is not intended to identify key features or essential features of the claimed subject matter, nor is it intended to be used to limit the scope of the claimed subject matter. A more extensive presentation of feature, details, utilities, and advantages of the present disclosure as defined in the claims is provided in the following written description of the various embodiments of the disclosure and illustrated in the accompanying drawings.

DETAILED DESCRIPTION

The following disclosure relates to accessory clamps. In an example, an accessory clamp may have an upper arm and a lower arm hinged together and biased shut in a closed position. The upper arm may have a gripping section made from a semi-flexible material configured to conform to the shape of the base object the clamp is attached to. The gripping section may have legs connected by cross braces and cross members, with gaps in between. The combination of the gaps, legs, cross braces, and cross members may help the upper arm better conform to the shape of the base object the clamp is attached to, as the components may flex with respect to each other and the clamp may conform to a base object's shape.

The upper arm may also feature a flexible overmold, which may increase the gripping surface area from that of a clip with only legs, cross braces, and cross members. The flexible over mold may feature a textured surface that further increases the surface area that the upper arm contacts, therefore improving clamp performance. In addition, the flexible over mold may prevent the legs from being damaged or forced apart past a flexibility point when attached to a base object with a unique shape.

The remaining portion of the upper arm including the hinged area and the entire lower arm may be made from a stiffer material than that of the gripping section, so that the clamp does not undesirably deform when opened.

Figure 1A:
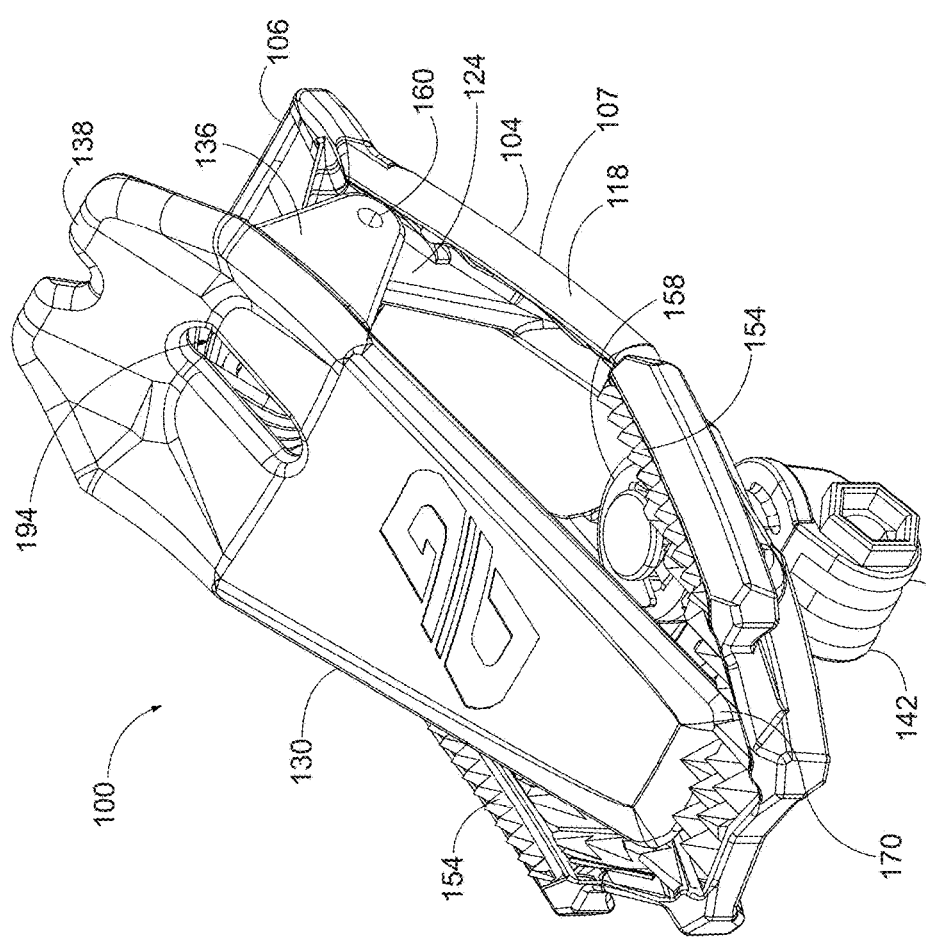
FIG. 1A is a top isometric view of an embodiment of an accessory clamp with an accessory mount in a first position.
Figure 1B:
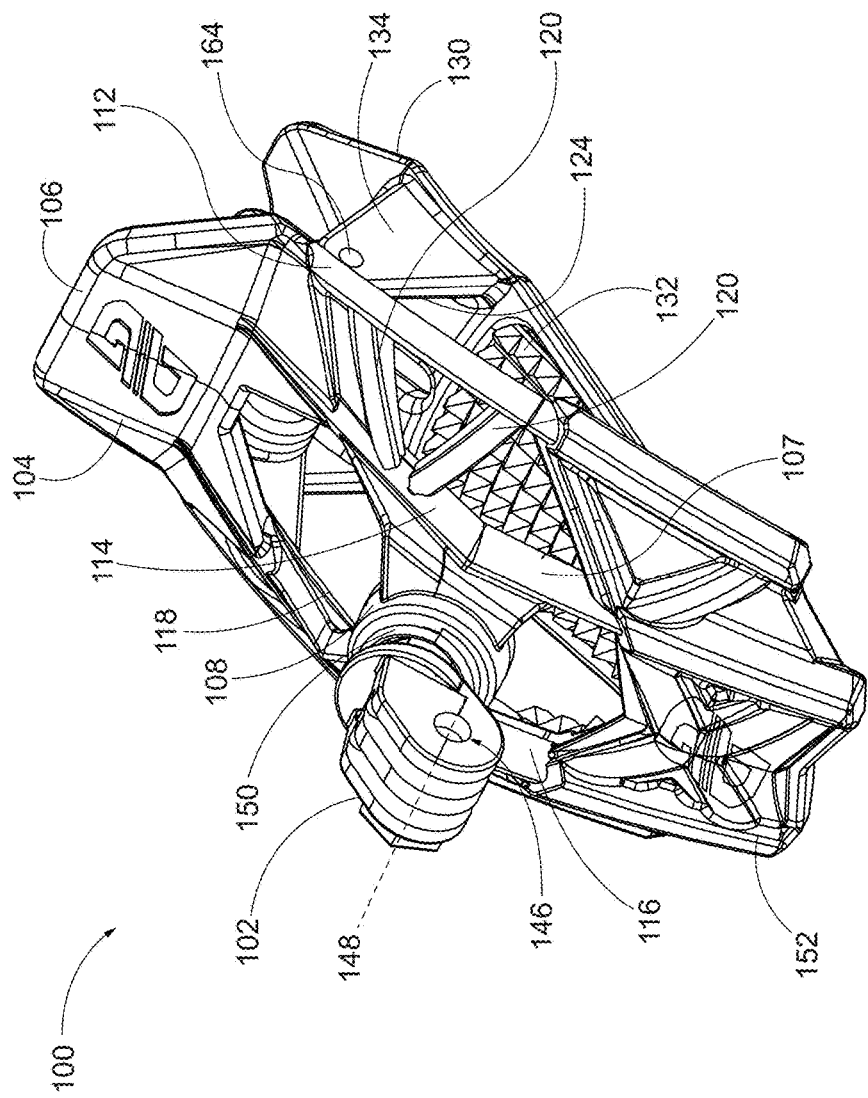
FIG. 1B is a bottom isometric view of the embodiment of the accessory clamp of FIG. 1A.
Figure 1C:
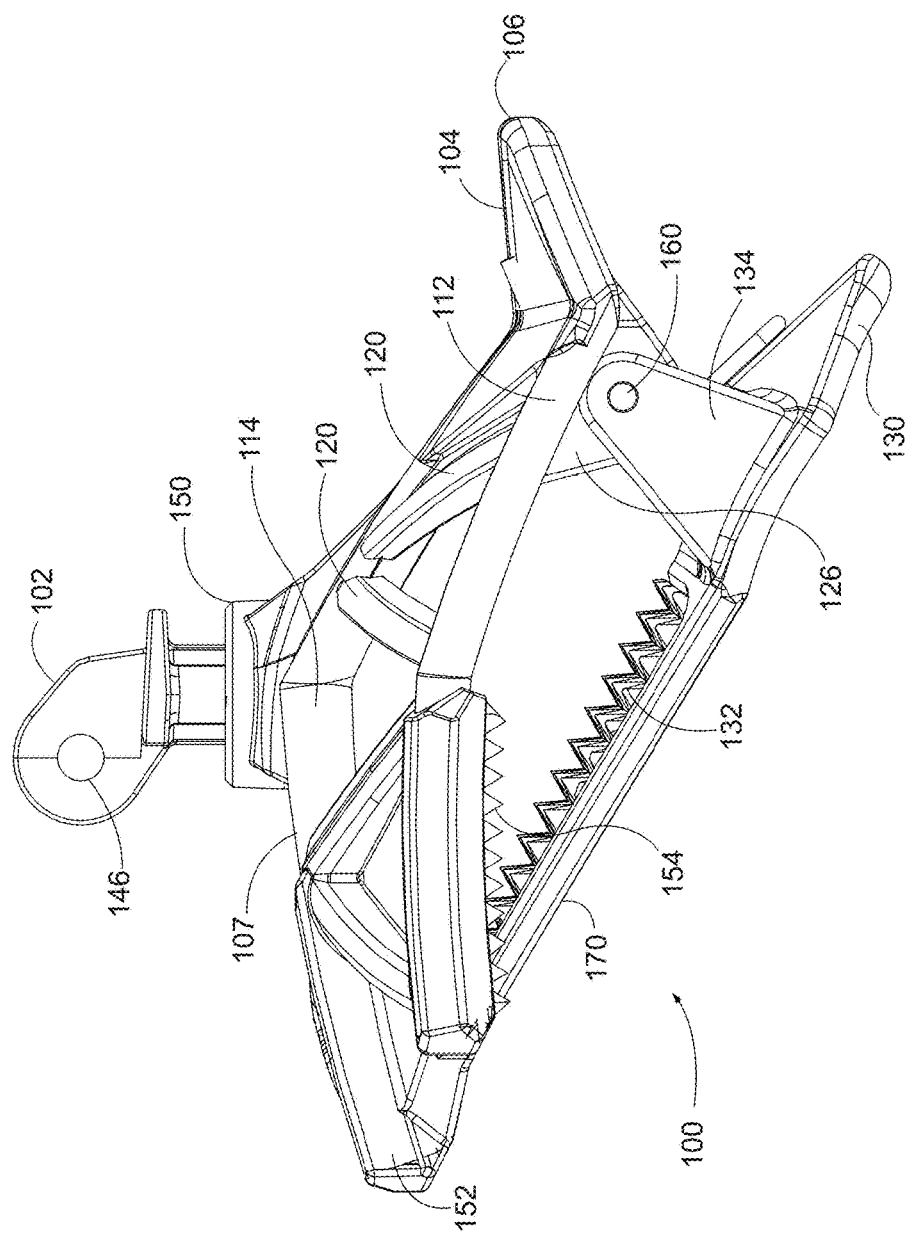
FIG. 1C is a side elevation view of the embodiment of the accessory clamp of FIG. 1A.

FIGS. 1A and 1B are isometric views of an embodiment of an accessory clamp 100 with an accessory mount 102 in a first position. FIG. 10 shows the accessory claim 100 from a side elevation view. The clamp of FIGS. 1A-1C has an upper arm 104 with an upper tab-like engagement member 106 and a framework 107 or scaffold structure extending therefrom. The framework 107 may include a number of legs 112, 114, 116, 118, a first cross brace 108 and a second cross brace 110 extending between an interior pair of the legs 114, 116, and a number of cross members 120 extending between laterally exterior legs 112, 118 and respective adjacent interior legs 114, 116. The upper arm 104 may be made in a unitary, monocoque construction and made of a material that, while maintaining the form of the framework 107, may resiliently flex to conform to an object held within the clamp 100. An elastomeric sleeve 152 having a textured surface 154 may cover or encase a portion of the framework 107 extending from the first cross brace 108 to envelope the second cross brace 110 and portions of the legs 112, 114, 116, 118. A socket 122 may be supported within the first cross brace 108. An accessory mount 102 may be mounted with the socket 122. First and second upper knuckles 124, 126 may extend downward from each of the interior legs 114, 116 adjacent to the upper engagement member 106.

A lower arm 130 may pivotably connect to the upper arm 104. The lower arm 130 may be formed as an elongate web having a textured surface 132 on a top side extending away from a lower tab-like engagement member 138 toward an end portion 170. First and second lower knuckles 134, 136 may extend from the lower arm 130 at an intermediate area between the lower engagement member 138 and the textured surface. The lower arm 130 may be made of a relatively stiff material, as compared to the material forming the upper arm 104, in a unitary, monocoque construction. The upper knuckles 124, 126 are configured to engage with the lower knuckles 134, 136 as opposing hinge plates in a pivot relationship. A clamp bias element 140 connects with both the upper arm 104 and the lower arm 130 to bias each toward the other about the pivot.

Figure 2:
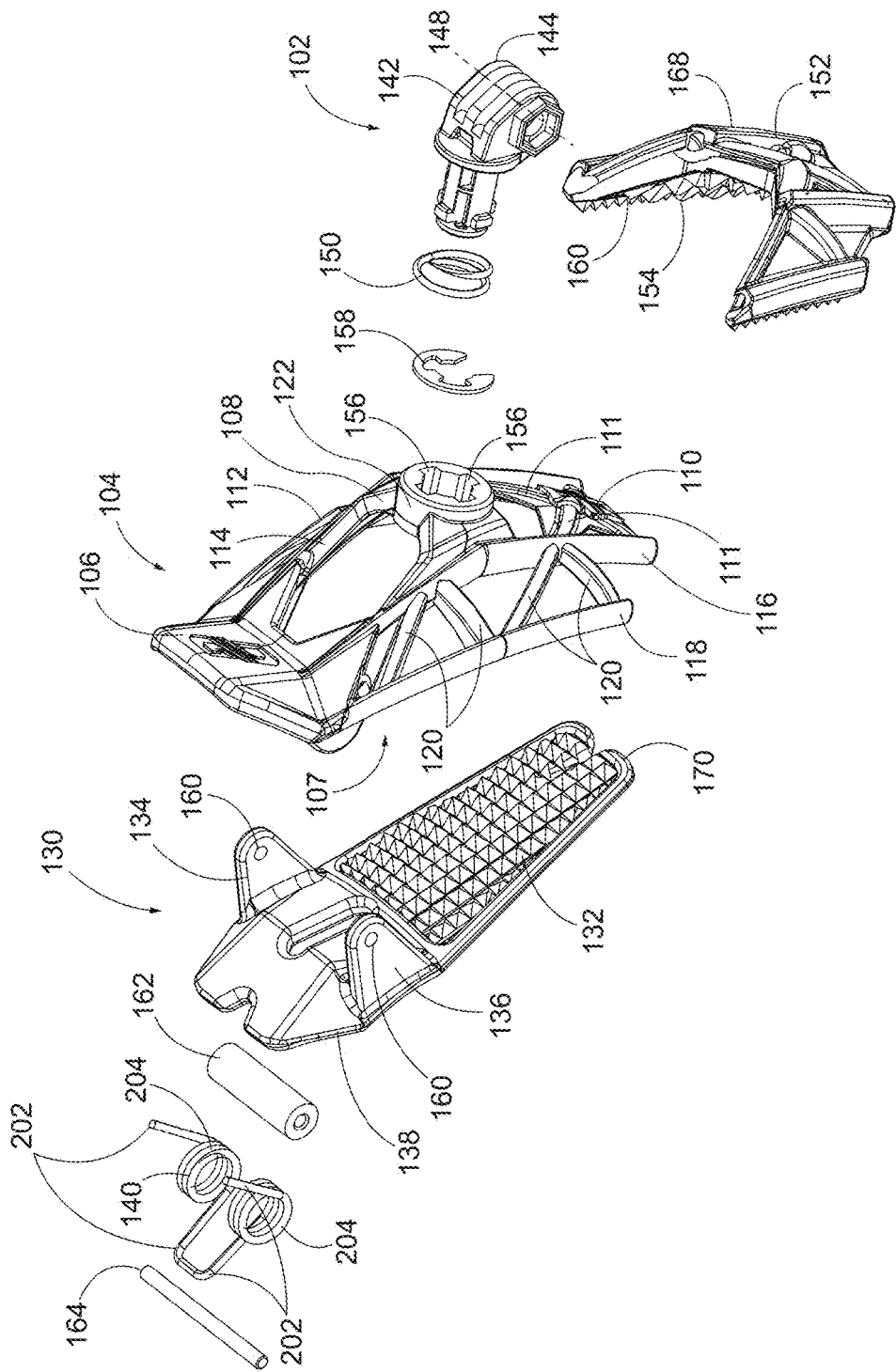
FIG. 2 is an exploded view of the clamp of FIG. 1A.

FIG. 2 is an exploded view of the clamp of FIG. 1A. The clamp 100 of FIG. 2 has an upper arm 104 an upper engagement member 106, a first cross brace 108, a second cross brace 110, legs 112, 114, 116, 118, a socket 122 with grooves 156, and an upper engagement member 106; a clip washer 158; an accessory mount bias element 150; an accessory mount 102 with an accessory engagement feature 142 with blade extensions 144, apertures 146 (shown in FIGS. 1 and 5), and a central axis 148; a sleeve 152 with a textured surface 154; a lower arm 130 with a lower engagement member 138, a textured surface 132, and knuckles 134, 136 with knuckle apertures 160; a spacer 162; a clamp bias element 140; and a pin 164.

The upper arm 104 may have a plurality of legs 112, 114, 116, 118 connected by cross braces 108, 110 and cross members 120. The legs 112, 114, 116, 118 may be adjacent to and extend away from the upper engagement member 106. In an example, the legs 112, 114, 116, 118 may be parallel at a section adjacent the upper engagement member 106, diverge away from each other at a section near the first cross brace 108, and then converge back toward each other at the second cross brace 110. In an example the legs 112, 114, 116, 118 are each connected with each other before extending away from the upper engagement member 106. The legs 112, 114, 116, 118 may be of the generally same length and width.

At least one cross member 120 may connect the first leg 112 and second leg 114 together and at least one cross member 120 may connect the third leg 116 and fourth leg 118 together. In an example, the first leg 112 is connected to the second leg 114 by at least one cross member 120, for example three cross members. In additional examples, the first leg 112 is connected to the second leg 114 with more or less cross members 120 or with at least one cross brace 108, 110. The second leg 114 may be connected to the third leg 116 by at least one cross brace 108, 110, for example two cross braces, but other examples may include more or less cross braces and at least one cross member. The third leg 116 may be connected to the fourth leg 118 in a connection similar to the connection of the first leg 112 and second leg 114. In additional examples, the third leg 116 and fourth leg 118 may be connected with different connection features than the first leg 112 and second leg 114. In an example, the cross member 120 may be a single extension that connects a leg to an adjacent alternate leg.

In an example, the cross members 120 connecting the first and second legs 112, 114 may be aligned with each other at acute angles. In other examples, the cross members 120 connecting the first and second legs 112, 114 may be aligned with each other at normal or oblique angles. In an example, the cross members 120 connecting the third and fourth legs 116, 118 may be aligned with each other at acute angles. In other examples, the cross members 120 connecting the third and fourth legs 116, 118 may be aligned with each other at normal or oblique angles.

In some examples, the legs 112, 114, 116, 118, cross braces 108, 110, and cross members 120 of the upper arm 104 may convexly curve away from the lower arm 130, with the socket 122 of the first cross brace 108 located at an apex of the convex curve.

In an example, the first cross brace 108 may be a single segment that spans between the second and third legs 114, 116 with a portion extending from the second leg 114 having a varied width, the width decreasing near the center of the cross brace 108, then increasing at a location joining the third leg 116. The first cross brace 108 may define and support a socket 122 configured to connect to an accessory mount 102 and accessory mount bias element 150.

In an example, the second cross brace 110 may have two extensions 111 that form a shape similar to that of an "x." In an example, the second cross brace 110 does not have gaps formed between the extensions 111 but instead has additional material filling in between the two extensions.

In an example, the sleeve 152 has a textured surface 154 and is directly molded onto the second cross brace 110 and a portion of each of the legs 112, 114, 116, 118 using an injection over mold process. The sleeve's textured surface 154 may be on an inside surface 166 of the sleeve 154 facing the lower arm 130 when assembled, and may have a smooth surface on outer surface 168 opposite the lower arm 130 when assembled. In an example, the textured surface 154 may be knurled, fluted, grooved, or otherwise tooled or formed with a surface treatment to provide a high friction or gripping surface against the lower arm as further described herein.

The sleeve 152 may be made from a material more flexible than the materials used for the upper and lower arms 104, 130. For example, a low durometer rubber that easily flexes and moves with the upper arm 104 may be used to comply with different shapes of the base object the clamp 100 may be attached to. In a closed position, an end portion 170 of the lower arm 130 may contact the textured surface 154 of the sleeve 152. In addition to the textured surface 154, the sleeve 152 may be made from a material which may increase the frictional forces between the sleeve 152 and a base object to which the clamp 100 is attached. The sleeve 152 may be attached to the upper arm 104 using an overmold process. This may help to prevent the sleeve 152 from separating from the upper arm 104 during use. The sleeve 152 may also help prevent the legs 112, 114, 116, 118 from flexing or being adjusted in an undesirable direction or position and prevent the legs 112, 114, 116, 118 from damage.

Figure 5:
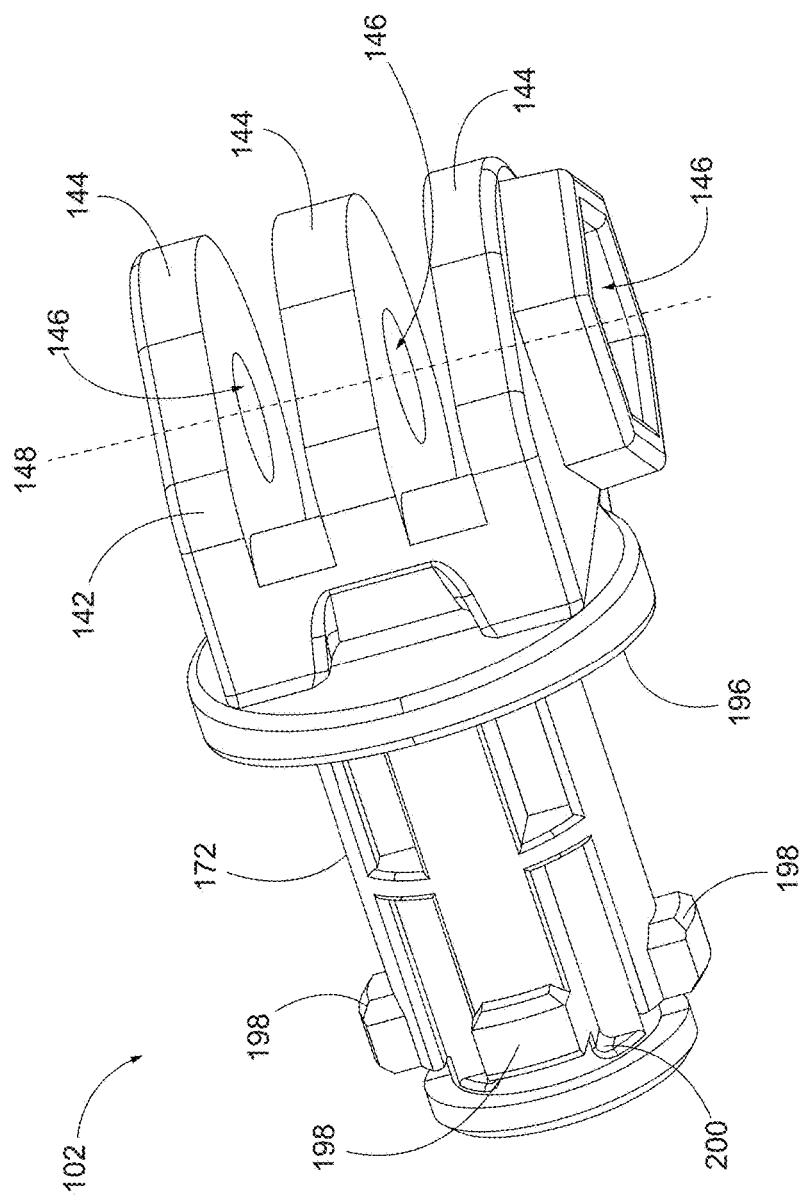
FIG. 5 is an isometric view of the accessory mount of the clamp of FIG. 1A.

An accessory mount 102 may be connected to the first cross brace 108 of the upper arm 104 through a socket 122. A shaft or post 172 extends from the accessory engagement feature to seat within and through the socket 122. An accessory mount bias element 150 may surround a portion of the post 172 of the accessory mount 102 as shown in FIG. 5. A clip washer 158 may be engaged with the accessory mount 102 to connect the accessory mount 102 to the upper arm 104. The accessory engagement feature 142 may be configured to connect to a variety of accessories, such as but not limited, to a camera, a camera accessory, a cell phone, a floatation member, a water bladder tube or mouth piece, keys, tools, drinking vessels, a wallet, writing utensils, laptops, tablets, etc.

The accessory mount 102 of FIG. 1 is shown in a first position and may be adjusted to multiple other positions. The accessory engagement feature 142 may be located on a side of the accessory mount 102 opposite the male post 172 (shown in FIG. 5). The accessory engagement feature 142 has a number of parallel blade extensions 144, each defining an aperture 146 concentric with a central axis 148. In the first position, the accessory engagement feature 142 is positioned at a location distal from the upper engagement member 106 with the central axis 148 generally perpendicular the legs 112, 114, 116, 118.

Figure 3:
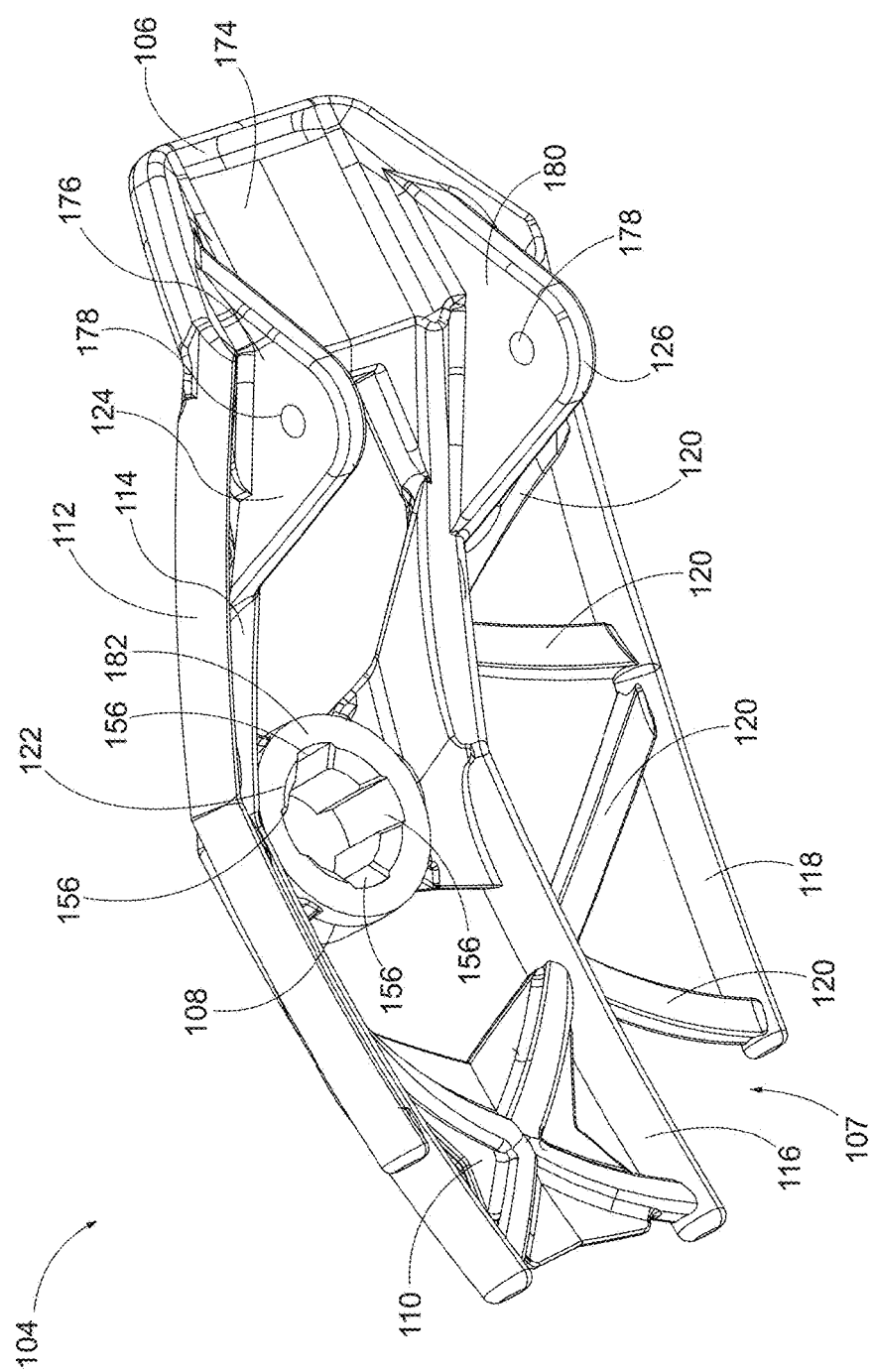
FIG. 3 is an isometric view of the upper arm of the clamp of FIG. 1A.

FIG. 3 is an isometric view of the upper arm 104 of the clamp 100 of FIG. 1. The upper arm 104 has an interior surface 174 with a first knuckle 124 having an external face 176 and an aperture 178, a second knuckle 126 with an internal face 180 and an knuckle aperture 178; an upper engagement member 106, legs 112, 114, 116, 118; a first cross brace 108; a socket 122 with grooves 156 and a bottom surface 182; a second cross brace 110; and cross members 120.

The first cross brace 108 of the upper arm 104 may have a socket 122. The accessory mount 102 may be connected to the first cross brace 108 of the upper arm 104 at the socket 122. The accessory mount 102 may have features, described in FIG. 5, configured to engage with the grooves 156 in the socket 122 to adjustably align the accessory mount 102 with respect to the upper arm 104.

The socket 122 may have a plurality of grooves 156 located on an interior surface. In an example, there are four grooves 156, but in other examples there may be more or less grooves. The socket 122 may have a bottom surface 182 configured to engage with the clip washer 158 to adjustably and rotatably connect the accessory mount 102 to the upper arm 104.

The upper arm 104 may have a first knuckle 124 and a second knuckle 126 that extend from an interior surface 174 of the upper arm 104 proximate the lower arm 130 when assembled. In an example, the upper arm 104 may have knuckles 124, 126 that extend from the upper engagement member 106, the second leg 114, and the third leg 116, toward the lower arm 130 when assembled. In an example, the knuckles 124, 126 extend from the upper engagement member 106 and the legs 112, 114, 116, 118. The knuckles 124, 126 may each have an aperture 178 extending through the individual knuckle, and both knuckle apertures 178 are arranged along a common center axis and sized to receive the pin 164. The upper arm knuckles 124, 126 may be configured to engage with the lower arm knuckles 134, 136, the pin 164, the spacer 162, and the clamp bias element 140.

Figure 4:
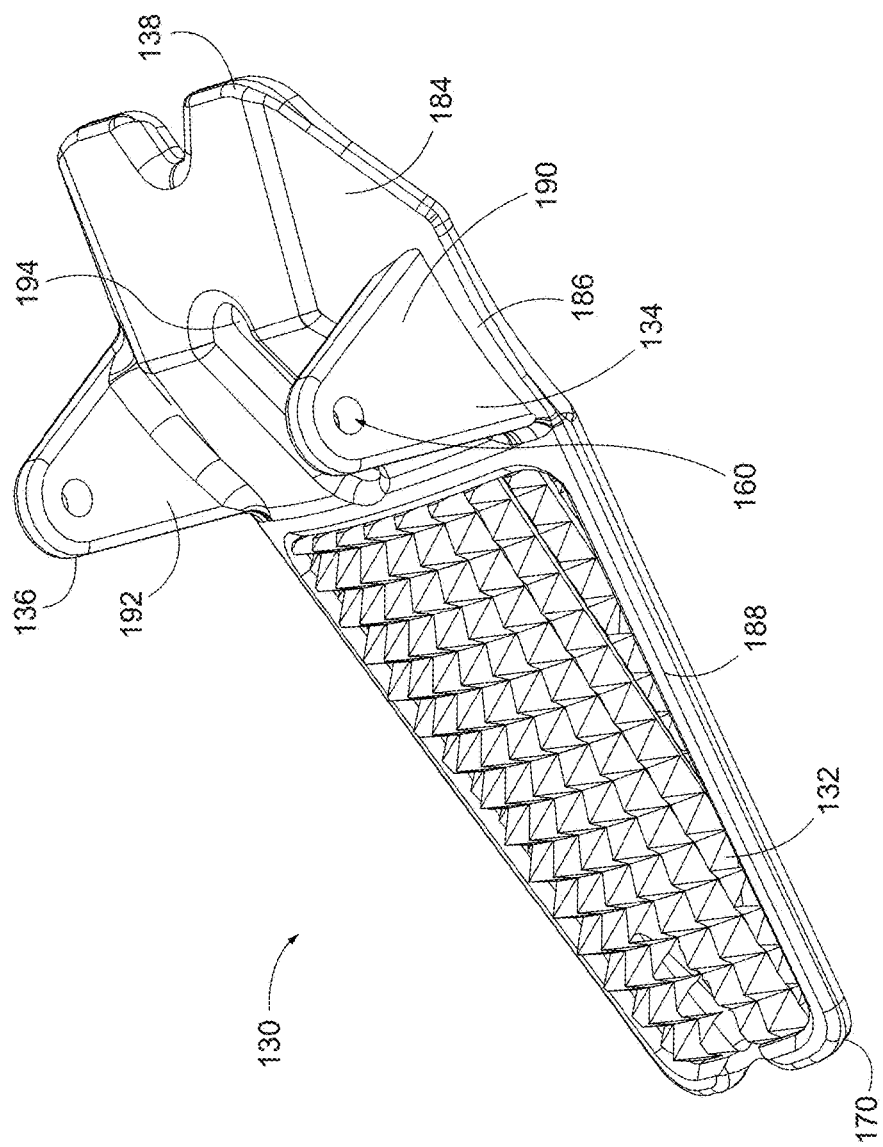
FIG. 4 is an isometric view of the lower arm of the clamp of FIG. 1A.

FIG. 4 is an isometric view of the lower arm 130 of the clamp 100 of FIG. 1. FIG. 4 shows a lower arm 130, a first section 184, a second section 186, a third section 188, a lower engagement member 138, a textured surface 132, a first knuckle 134, a second knuckle 136, an exterior face 190, an interior face 192, a knuckle aperture 160, an aperture 194, and an end 170.

The lower arm 130 has three sections 184, 186, 188, each having a surface proximate the upper arm when assembled. The lower engagement member 138 is included in the first section 188. The second section 186 has a first knuckle 134 with an exterior face 190, and a knuckle aperture 160 extending through the first knuckle 134; a second knuckle 136 having an interior face 192 and knuckle aperture 160 extending through the second knuckle 136, both knuckle apertures 160 arranged along a common center axis and sized to receive the pin 164. The first and second sections 184, 186 of the lower arm 130 may have an aperture 194 extending through them. In addition, the third section 188 may include the end 170 of the lower arm 130, with a textured surface 132.

The lower arm 130 may have knuckles 134, 136 that extend from a second section 186 toward the upper arm 104 when assembled. In an example, the knuckles 124, 126, 134, 136 of the upper and lower arms 104, 130 may be used to connect the upper and lower arms 104, 130.

The third section 188 of the lower arm 130 may be concavely curved inward toward the upper arm 104 when assembled. The third section 188 may have a textured surface 132 proximal the upper arm 104 when assembled. In an example, the textured surface 132 may be knurled, fluted, grooved, or otherwise tooled or formed with a surface treatment to provide a high friction or gripping surface against the sleeve as further described herein. In an example, the textured surface 132 may have features such as peaks formed as individual pyramids having four symmetrical triangular sides extending away from the third section and toward the upper arm when assembled. In additional examples, the textured surface 132 may have asymmetrical features. The textured surface 132 may be manufactured as a different component from that of the lower arm 130, or the textured surface 132 and the lower arm 130 may be manufactured as a single part. The textured surface 132 may be manufactured using a material different than that of the lower arm 130, or it may be made from the same material as the lower arm 130.

In an example, the upper arm 104, lower arm 130, and sleeve 152 may be made from plastic or a similar material. In an example, the upper arm 104, lower arm 130, and sleeve 152 may be made from dissimilar materials. In an example, the lower arm 130 may be made from glass filled polypropylene, which may have an increased strength than a lower arm manufactured without glass filling. Features of the material selected for the lower arm 130 may include that the finished arm may be stiffer with increased strength and heat resistance. An example material may be a blend of material including polypropylene with a range of glass fill from 10-30%. In an example, the lower arm 130 is manufactured using injection molding, although other manufacturing processes may be used.

In an example, the upper arm 104 may be made from a blend of polypropylene and santoprene. In an example, the material mixture may be 60-80% polypropylene and 20-40% santoprene. The santoprene may be used to increase the flexibility of the upper arm. In an example, the material used to create the upper arm 104 is more flexible than the material used to create the lower arm 130. In an example, the upper arm 104 is manufactured using injection molding, although other manufacturing processes may be used.

FIG. 5 is an isometric view of the accessory mount 102 of the clamp 100 of FIG. 1. The accessory mount 102 has an accessory engagement feature 142 having blade extensions 144, apertures 146, and a central axis 148; a mating surface 196; and a male post 172 with detents 198 and an annular groove 200. The detents 198 may be shaped to correspond to and configured to engage with the grooves 156 in the socket 122 of the upper arm 104. The annular groove 200 may be configured to engage with the clip washer 158, shown in FIG. 2, for assembly of the accessory mount 102 to the upper arm 104. The mating surface 196 may be configured to engage with the bottom surface 182 of the upper arm's socket 122.

Figure 6:
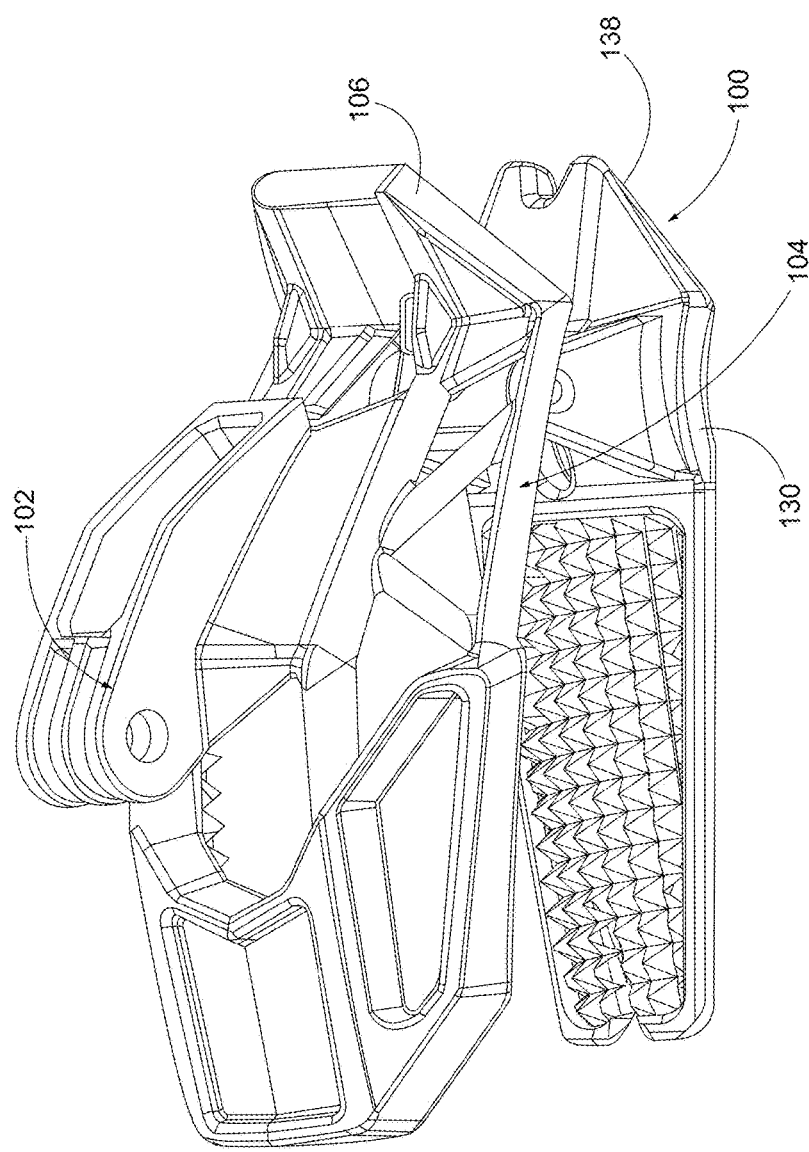
FIG. 6 is an alternate embodiment of an accessory clamp.

FIG. 6 is an alternate embodiment of an accessory clamp 100. The clamp 100 has an upper arm 104 with an upper engagement member 106; a lower arm 130 with a lower engagement member 138; and an accessory mount 102. The embodiment is similar to that of FIG. 1, except that the position of the accessory mount 102 is fixed and cannot be adjustably rotated with respect to the upper arm 104.

Other configurations of the upper and lower arms are also contemplated. In an example, the upper arm and lower arm may be made from a single injection molded part with compliant mechanisms and living springs. Another example of the design includes different sizes and shapes of the upper arm and lower arm including rigid designs.

The clamp 100 may be assembled by connecting the upper arm 104 and the lower arm 130. The sleeve 152 may be attached or connected to an end of the upper arm opposite the upper engagement member 106. The upper arm 104 and lower arm 130 may be connected through a pin 164 that aligns and connects knuckles 124, 126 of the upper arm 104 with the knuckles 134, 136 of the lower arm 130. When assembled, the pin 164 may be covered by a spacer 162 and a clamp bias element 140, for example a torsion spring with at least one pair of extending arms 202.

When assembled, the upper arm's knuckles 124, 126 fit between the lower arm's knuckles 134, 136. A spacer 162 may be installed through a center of the windings of the clamp bias element 140. The clamp bias element 140 and spacer 162 may seat between upper arm's knuckles 124, 126. The pin is then slid through apertures 160, 178 located in the knuckles of the upper and lower arms 104, 130, aligning the upper arm's first knuckle 124 (shown in FIG. 3) with the lower arm's first knuckle 134. The pin 164 will continue to be slid through the spacer 162 installed within the center of the windings of the clamp bias element 140, and then extend through apertures 160, 178 in the upper arm's second knuckle 126 (shown in FIG. 3) and the lower arm's second knuckle 136. The pin 164 connects the first and second knuckles 124, 126, 134, 136 of the upper and lower arms 104, 130 to each other to create a clamp 100 with the upper arm 104 and lower arm 130 pivoting about the pin 164. In an example, the extending arms of the clamp bias element contact the interior facing surfaces of both the upper engagement member and the lower engagement member. In a resting position, the clamp bias element forces the interior facing surfaces away from each other, which forces the ends of the upper arm and the lower arm together, creating a closed clamp.

In an example, the clamp bias element has one pair of extending arms. In an example shown in FIG. 2, the clamp bias element 140 has two windings 204, each with a pair of extending arms 202, each pair of arms 202 extending from the center of the its respective windings. A first arm of the first pair 202 of the first winding 204 may be connected to a first arm of the second pair 202 of the second winding 204. A clamp using at least two windings and two pairs of extending arms may better balance the bias forces exerted on the interior surfaces of the upper and lower arms. The balanced bias force may be desired so that when the clamp is opened, the biased forces are spread more evenly across the interior surfaces and may prevent an uneven load from being transmitted through the spacer and the shaft as opposed to pivoting around it, causing potential damage to and failure of the clamp. In addition, the two windings and associated extending arms may allow for the bias force of the clamp to be increased, thereby providing a stronger clamp that may more securely engage with a base objet.

In general, an example clamp may allow a user to temporarily, securely attach an accessory, such as a camera, a cell phone, a floatation member, a water bladder tube or mouth piece, keys, poles, tools, etc. to a base object, such as a helmet, a handlebar, a backpack, a tent, furniture, a vehicle, a tail gate, etc.

The clamp bias element 140, for example a dual spring, may bias the clamp 100 closed in a resting position. To use the clamp 100, a user may grasp the engagement members 106, 138 of the upper and lower arms 104, 130 and apply a compressive force, overcoming the biased spring force in the clamp bias element 140 to move the upper and lower arms 104, 130 apart from each other at the unconnected ends opposite the engagement members 106, 138. When the user desires to close the clamp 100, for example to attach the clamp 100 to a base object, the user releases the engagement members 106, 138 and the clamp bias element 140 forces the engagement members 106, 138 away from each other, forcing the unconnected ends opposite the engagement members 106, 138 back toward each other.

The ability to quickly and securely, temporarily attach an accessory to a base object may be desired when the base object contains a variety of shapes, or if a user would like to repeatedly attach the same accessory to a variety of objects without the need for multiple mounts. For example, attaching a camera to a shaped surface may be challenging since the camera may not be balanced or stay in a fixed position. The clamp 100 device of the current disclosure may eliminate some of those challenges. The ability to quickly engage and disengage the clamp 100 may allow a user the ability to easily move the clamp 100 from different base objects. For example, if a camera is attached to the clamp's accessory mount 102, the clamp 100 can be connected to a handle bar and then easily moved to a helmet depending on the user's desires.

The clamp 100 may be easily operated with gloved hands, as the engagement members 106, 108 can be easily accessed even if a user's fingers are encased in gloves, mittens, or other protective coverings. This may be desirable so that a user does not need to unnecessarily remove protective coverings to adjust the clamp's location or orientation.

In addition, a consumer may prefer to attach the clamp 100 to a base object and then easily change the accessory connected to the clamp 100. In an example, the user may attach the clamp 100 to the front of a helmet and connect a camera to the accessory mount 102. The user may then remove the camera and attach an alternate accessory to the accessory mount 102 without disconnecting the clamp 100 from the helmet.

In an example, the clamp bias element 140 may have a spring constant. In an example, the clamp bias element 140 may be sized to require a specified force in pounds to force the clamp 100 open, making the clamp bias element 140 relatively stiff. A stiff clamp bias element 140 may help the clamp 100 remain in a closed position so that when a user attaches it to a base object, the clamp 100 remains substantially fixed to the base object. For example, if a user attaches a camera to the accessory mount 102 and then attaches the clamp 100 to a helmet, the clamp 100 would need to remain fixed in place even as the user engages in high impact or high speed activities. For example, in activities such as motorcycling, off-roading, dirt biking, bmx riding, road biking, snowmobiling, skateboarding, and the like in which the helmet experiences large impacts, shocks, and movement or high speeds, the clamp 100 should not move with respect to the helmet. The stiff clamp bias element 140 may also help to keep the clamp 100 in place when a relatively heavy accessory is attached to the accessory mount.

The textured surface 132 of the lower arm 130 and the sleeve 152 may aid in the clamp 100 being adjustably secured to the base object. The frictional force generated between the textured surface 154 of the sleeve 152, the textured surface 132 of the lower arm 130, and the base object due to the clamp bias element 140 may further assist in the clamp 100 being temporarily secured to the base object. The textured surfaces 132, 154 may help the clamp 100 engage with the base object better than a clamp that features two flat, smooth arms. The textured surfaces 132, 154 may conform and flex with the base object, enabling the clamp 100 to be used in a variety of activities and attached to a variety of differently shaped base objects.

Furthermore, the upper arm 104 may feature legs 112, 114, 116, 118 that allow the upper arm 104 to flex to better engage with the base object. The legs 112, 114, 116, 118 may individually conform to the shape of the base object such that each leg may deflect, flex, twist, etc. in a different direction based upon the shape of the base object. To ensure that the clamping force of the clamp 100 is maintained even with the flexible legs 112, 114, 116, 118, the legs 112, 114, 116, 118 may be connected to each other using cross members 120 and cross braces 108, 110. The cross members 120 and cross braces 108, 110 may help improve the strength and durability of the clamp 100 while still allowing the legs 112, 114, 116, 118 to flex and conform to a shape of the base object. The upper arm 104 may be more flexible than the lower arm 130, therefore allowing the lower arm 130 to act as a brace against the base object while the upper arm 104 flexes to conform to the shape of the base object.

The upper engagement member 106 of the upper arm 104 may be stiffer than the legs 112, 114, 116, 118, cross braces 108, 110, and cross members 120 of the upper arm 104. The increased stiffness of the upper engagement member 106 may help so that the force required to open the clamp 100 does not cause the deformation of the upper engagement member 106 and decrease the durability of the clamp 100.

Figure 7:
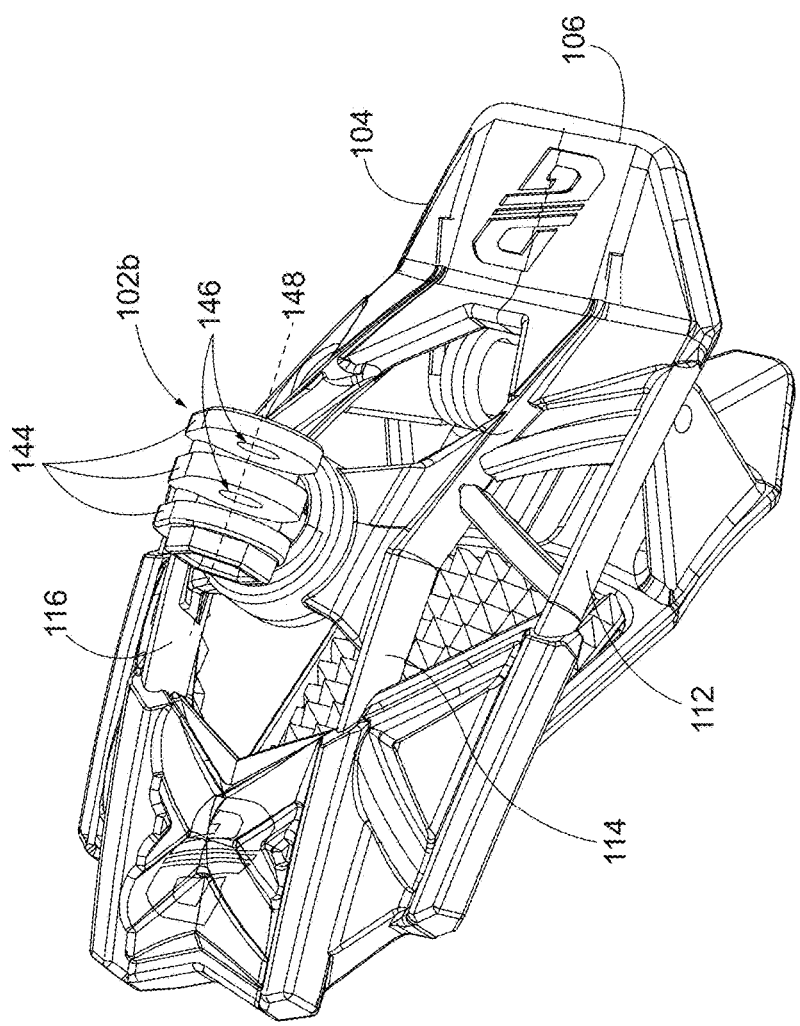
FIG. 7 is an isometric view of the clamp of FIG. 1A with the accessory mount in a second position.

FIG. 7 is an isometric view of the clamp of FIG. 1 with the accessory mount 102 in a second position. The clamp of FIG. 7 has an upper arm 104 with an upper engagement member 106, a socket 122, and legs 112, 114, 116; and an accessory mount 102*b* in a second position with an accessory engagement feature 142 having blade extensions 144, apertures 146, and a central axis 148. The accessory mount 102*b* in the second position is rotated within the socket 122 so that it is 90 degrees rotated from the accessory mount 102 in a first position shown in FIG. 1. In this second position, the central axis 148 is somewhat parallel the legs 112, 114, 116 and is proximal the second leg 114 of the upper arm 104.

Figure 8:
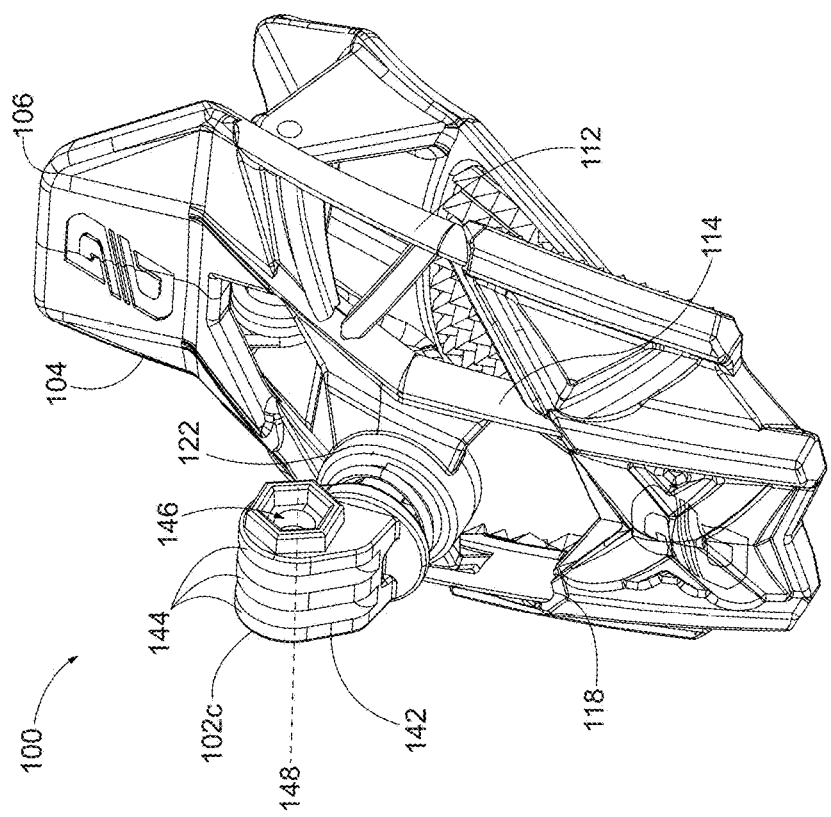
FIG. 8 is an isometric view of the clamp of FIG. 1A with the accessory mount in a third position.

FIG. 8 is an isometric view of the clamp of FIG. 1 with the accessory mount in a third position. The clamp 100 of FIG. 8 has an upper arm 104 with an upper engagement member 106, a socket 122, and legs 112, 114, 116; and an accessory mount 102*c* in a third position with an accessory engagement feature 142 having blade extensions 144, apertures 146, and a central axis 148. The accessory mount 102*c* in the third position is rotated within the socket 122 so that it is 180 degrees rotated from the first position shown in FIG. 1. In this third position, the central axis 148 is somewhat perpendicular the legs 112, 114, 116 and is proximal the upper engagement member 106 of the upper arm 104.

Figure 9:
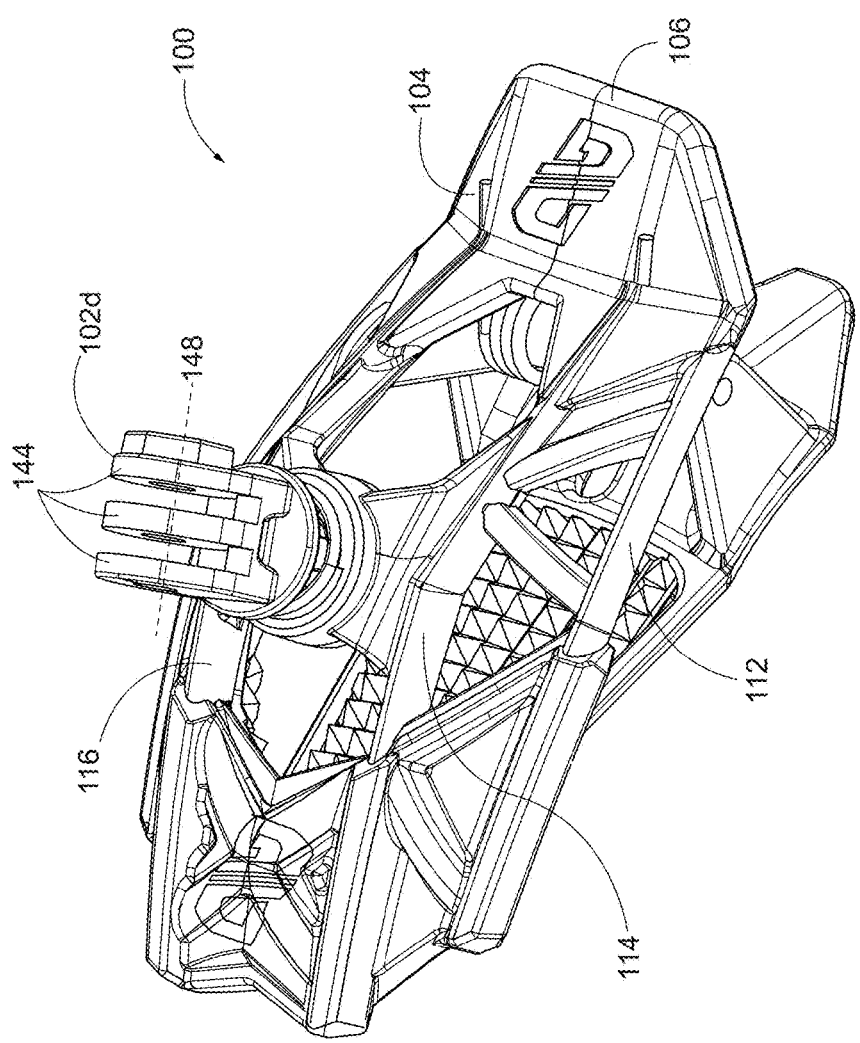
FIG. 9 is an isometric view of the clamp of FIG. 1A with the accessory mount in a fourth position.

FIG. 9 is an isometric view of the clamp of FIG. 1 with the accessory mount in a fourth position. The clamp 100 of FIG. 9 has an upper arm 104 with an upper engagement member 106, a socket 122, and legs 112, 114, 116; and an accessory mount 102*d* in a fourth position with an accessory engagement feature 142 having blade extensions 144, apertures 146 (shown in FIG. 8), and a central axis 148. The accessory mount 102*d* in the fourth position is rotated within the socket 122 so that is it rotated counterclockwise 270 degrees from the first position shown in FIG. 1, and 180 degrees rotated from the second position shown in FIG. 7. In this fourth position, the central axis 148 is somewhat parallel the legs 112, 114, 116 and is distal the second leg 114 of the upper arm 104.

The accessory mount 102 may be configured to rotate with respect to the upper arm 104. For example, the accessory mount 102 may be pushed toward the upper arm 104, overcoming the biasing force in the accessory mount bias element 150 so that the detents 198 on the male post 172 of the accessory mount 102 disengage with the grooves 156 in the sprocket 122 of the upper arm 104. In an example, the accessory mount 102 may rotate 360 degrees with respect to the upper arm 104, but it may be fixedly rotated in 90 degree increments, as shown in FIGS. 1, and 7-9. The fixed rotation may be enabled through the interaction of the detents 198 and the grooves 156, such that the detents 198 are spaced 90 degrees apart from each other, and the grooves 156 are also spaced 90 degrees apart from each other. The accessory mount 102 may be rotated so that a first detent fits in a first groove, the second detent fits in the second groove, the third detent fits in the third groove, and the fourth detent fits in the fourth groove. The user may then rotate the accessory mount so that the first detent fits within the second groove and the second detent fits within the third groove, etc.

The interaction of the detents 198 and grooves 156 may enable the user to customize and securely adjust the alignment of the accessory attached to the accessory mount 102 with respect to the clamp 100 and the base object the clamp 100 is attached to. The interaction of the detents 198 and the grooves 156 may also help prevent the accessory mount 102 from inadvertently rotating, either due to forces and impacts sustained by the clamp 100, based upon movements of the base object, or forces, including moments, caused by the accessory attached to the accessory mount 102.

In an example, the lower arm 130 may feature at least one aperture 194 in the first and second sections 184, 186. The aperture 194 may be used to allow a user to connect an alternate accessory through the upper and lower arms 104, 130 of the clamp 100. For example, a user may route a water bladder tube through the aperture 194 in the lower arm 130 and between the second and third legs 114, 116 and first cross brace 108 of the upper arm 104, enabling the user the connect the clamp 100 to a helmet to effectively position the water bladder tube near the user's mouth. Without the clamp 100, the user might have to drill apertures through or otherwise permanently modify the helmet to accommodate the water bladder tube, which may comprise the structural aspects and therefore the safety elements of the helmet.

In an example, a layout of the legs 112, 114, 116, 118, the cross members 120, and the cross braces 108, 110 may enable a user to temporarily connect a flexible object to the clamp 100. In an example, a flexible member, such as a cord, cable, string, strap, fishing line, or rope, may be threaded about a single cross member 120, cross brace 108, 110, leg 112, 114, 116, 118, or a combination thereof. The flexible member may then be connected to the base object which the clamp 100 is attached to as a fail safe in case the clamp 100 is subjected to forces that overcome the force exerted by the clamp bias element 140 such that the clamp 100 is accidentally disengaged from the base object.

Although various representative embodiments of this disclosure have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, counterclockwise, x-axis, y-axis, and z-axis) are only used for identification purposes to aid the reader's understanding of the embodiments of the present disclosure, and do not create limitations, particularly as to the position, orientation, or use of the disclosure unless specifically set forth in the claims. Joinder references (e.g., attached, coupled, connected) are to be construed broadly and may include intermediate members between a connection of elements and relative movement between elements. As such, joinder references do not necessarily infer that two elements are directly connected and in fixed relation to each other.

In some instances, components are descried with reference to "ends" having a particular characteristic and/or being connected with another part. However, those skilled in the art will recognize that the present disclosure is not limited to components which terminate immediately beyond their points of connection with other parts. Thus, the term "end" should be interpreted broadly, in a manner that includes areas adjacent, rearward, forward of, or otherwise near the terminus of a particular element, link, component, part, or member. In methodologies directly or indirectly set forth herein, various steps and operations are described in one possible order of operation, but those skilled in the art will recognize that steps and operations may be rearranged, replaced, or eliminated. It is intended that all matter contained in the above description or shown in the accompanying drawings shall be interpreted as illustrative only and not limiting. Changes in detail or structure may be made.

What is claimed is:

1. A clamp comprising
   an upper arm having
      a framework of a plurality of legs and cross members joined together and configured to flex with respect to each other when placed under a load;
      a first tab extending at an angle from one end of the framework;
      a first hinge plate positioned between the framework and the first tab; wherein
      the framework, the tab, and the first hinge plate are formed as unitary, monocoque construction;
   a lower arm pivotably connected to the upper arm and having
      an elongate web;
      a second tab extending at an angle from one end of the elongate web; and
      a second hinge plate positioned between the elongate web and the second tab and attached to the first hinge plate at a pivot connection; wherein
      the elongate web, the second tab, and the second hinge plate are formed as unitary, monocoque construction; and
   a bias member attached to each of the upper arm and the lower arm and positioned between the upper arm and the lower arm to bias the upper arm and the lower arm together about the pivot connection between the hinge plates;
a cross brace extending between two of the legs and defining a socket
   an accessory mount configured to be received within the socket wherein
      the socket further defines one or more key features;
      the accessory mount defines one or more opposing key features configured to interface with the key features on the socket;
      the accessory mount includes a shaft that extends within the socket and allows for longitudinal and rotational movement between the accessory mount and the socket; and
      a spring is positioned to interface between the socket and the accessory mount to bias the accessory mount in a first position against longitudinal movement in which the key features and the opposing key features interface to prevent rotation of the accessory mount within the socket.

2. The clamp of claim 1, wherein
   the upper arm is made of a first material that maintains the form of the framework while resiliently flexing; and
   the lower arm is made of a second material that is stiff in comparison to the first material.

3. The clamp of claim 1, wherein a first textured surface is formed one side of the elongate web of the lower arm facing the upper arm.

4. The clamp of claim 1, further comprising a sleeve made of an elastomeric material covering at least a portion of the framework.

5. The clamp of claim 4, wherein a portion of the sleeve comprises a second textured surface oriented opposite the first textured surface on the elongate web.

6. The clamp of claim 1, wherein the key features and the opposing key features are configured to interface in a plurality of discrete rotational positions.

7. The clamp of claim 1, wherein the legs and cross members of the framework define a concave structure above the lower arm.

8. A clamp comprising
an upper arm having
a first end;
a second end opposite the first end;
an upper engagement member adjacent the first end;
a plurality of knuckles extending from an interior surface of the upper engagement member;
a plurality of legs extending from the upper engagement member toward the second end;
a plurality of cross members connected to and extending between the legs;
a first cross brace connected to and extending between the legs and defining a socket which further defines grooves on an inside surface of the socket
a second cross brace connected to and extending between the legs;
a lower arm having
a first end;
a second end opposite the first end;
a lower engagement member adjacent the first end;
a plurality of knuckles extending from an interior surface of the lower engagement member;
a pin connecting the upper arm knuckles to the lower arm knuckles;
a clamp bias element surrounding the pin and adjacent the upper engagement member and lower engagement member, the clamp bias element in a first position forcing the upper engagement member away from the lower engagement member and forcing the second end of the upper arm toward the second end of the lower arm; and
an accessory mount adjustably connected to the socket further comprising an elastomeric textured sleeve positioned at the second end of the upper arm and surrounding a portion of the legs and the second cross brace.

9. The clamp of claim 8, wherein the sleeve is over molded onto the upper arm.

10. The clamp of claim 8, further comprising a plurality of detents extending from a male post of the accessory mount.

11. The clamp of claim 10, wherein the detents adjustably engage with the grooves in the socket.

12. The clamp of claim 8, further comprising an accessory engagement feature with a plurality of extensions, the extensions having an aperture extending therethrough, and a common axis extending through the apertures.

13. The clamp of claim 8, wherein a first portion of the legs, a number of the cross members, and the second cross brace distal from the upper engagement member are made of a first material that maintains its form while resiliently flexing and a remainder of the upper arm is made of a second material that is stiff in comparison to the first material.

14. The clamp of claim 8, wherein the lower arm is made of a material that is stiff in comparison to the first material.

15. The clamp of claim 8, wherein the upper arm is formed as unitary, monocoque construction and the lower arm is formed as a unitary, monocoque construction.

16. The clamp of claim 8, wherein the legs and cross members define a concave structure above the lower arm.

17. A clamp comprising
an upper arm having
a first end;
a second end opposite the first end;
an upper engagement member adjacent the first end;
a plurality of knuckles extending from an interior surface of the upper engagement member;
a plurality of legs extending from the upper engagement member toward the second end;
a plurality of cross members connected to and extending between the legs;
a first cross brace connected to and extending between the legs and defining a socket which further defines grooves on an inside surface of the socket
a second cross brace connected to and extending between the legs;
a lower arm having
a first end;
a second end opposite the first end;
a lower engagement member adjacent the first end;
a plurality of knuckles extending from an interior surface of the lower engagement member;
a pin connecting the upper arm knuckles to the lower arm knuckles;
a clamp bias element surrounding the pin and adjacent the upper engagement member and lower engagement member, the clamp bias element in a first position forcing the upper engagement member away from the lower engagement member and forcing the second end of the upper arm toward the second end of the lower arm;
an accessory mount adjustably connected to the socket and further comprising an accessory mount bias element that surrounds the male post and adjustably biases the accessory mount against the socket.

* * * * *